United States Patent
Rozanski et al.

[11] Patent Number: 5,627,880
[45] Date of Patent: *May 6, 1997

[54] MAHO METHOD FOR SFH-CDMA/TDMA USING PUNCTURED FRAMES

[75] Inventors: Walter Rozanski, Hurst; Kamyar Rohani, Ft. Worth, both of Tex.

[73] Assignee: Motorola, Inc., Schaumburg, Ill.

[*] Notice: The term of this patent shall not extend beyond the expiration date of Pat. No. 5,493,563.

[21] Appl. No.: 424,823

[22] Filed: Apr. 19, 1995

Related U.S. Application Data

[63] Continuation of Ser. No. 970,213, Nov. 2, 1992, abandoned.

[51] Int. Cl.⁶ .................................................. H04Q 7/22
[52] U.S. Cl. .................... 379/59; 370/335; 370/337; 455/33.2; 455/33.1; 379/60
[58] Field of Search ........................... 379/58, 59, 60, 379/61; 370/95.1, 95.3, 18; 455/33.1, 33.2, 54.1, 54.2; 375/200, 202, 201, 205

[56] References Cited

U.S. PATENT DOCUMENTS

| | | | |
|---|---|---|---|
| 4,833,702 | 5/1989 | Shitara et al. | 379/60 |
| 4,850,036 | 7/1989 | Smith | 375/202 X |
| 4,866,710 | 9/1989 | Schaeffer | 455/33.2 |
| 4,872,205 | 10/1989 | Smith | 455/51.1 |
| 5,128,959 | 7/1992 | Bruckert | 379/59 |
| 5,159,593 | 10/1992 | D'Amico et al. | 370/95.3 |
| 5,199,031 | 3/1993 | Dahlin | 370/110.1 |
| 5,200,957 | 4/1993 | Dahlin | 379/63 |
| 5,257,398 | 10/1993 | Schaeffer | 379/63 |
| 5,267,244 | 11/1993 | Messerschmitt et al. | 370/95.3 |
| 5,287,384 | 2/1994 | Avery et al. | 375/1 |
| 5,291,475 | 3/1994 | Bruckert | 370/95.3 |
| 5,301,188 | 4/1994 | Kotzin et al | 379/59 |
| 5,381,443 | 1/1995 | Borth et al. | 375/1 |
| 5,414,731 | 5/1995 | Antunes et al. | 375/202 |
| 5,493,563 | 2/1996 | Rozanski et al. | 379/60 X |

*Primary Examiner*—Dwayne D. Bost
*Assistant Examiner*—William G. Trost
*Attorney, Agent, or Firm*—Raymond J. Warren

[57] ABSTRACT

In a frequency hopping cellular communication system (40) having a number of base sites (41–48) and using mobile assisted handoff, a method is offered of providing base site identification signals. The method includes the steps of assigning each base site of the number of base sites to a slot of a intersite control frame; and, periodically transmitting, in the assigned slot of the intersite control frame, the identification signal of the base site.

20 Claims, 2 Drawing Sheets

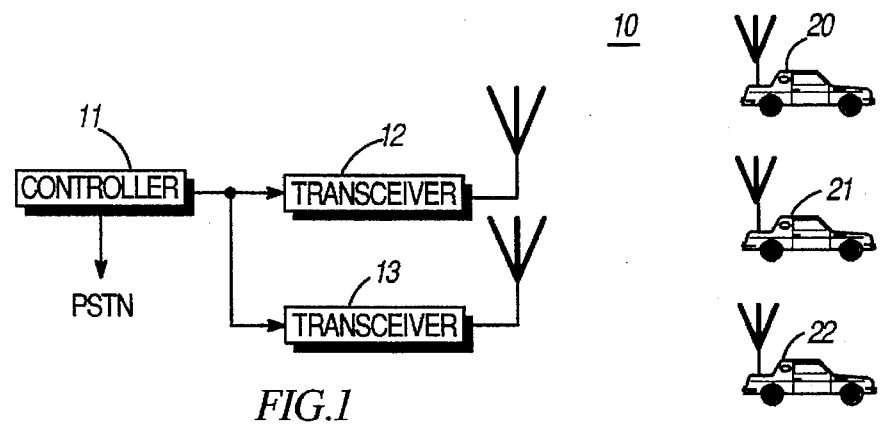
FIG.1
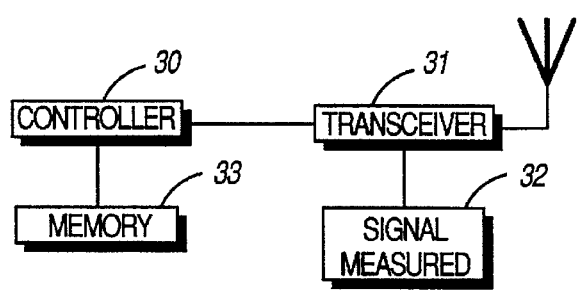
FIG.2
```
CODE-1:   1  2  3  4  5  6  7  8  9 10
CODE-2:   2  4  6  8 10  1  3  5  7  9
CODE-3:   4  8  1  5  9  2  6 10  3  7
CODE-4:   8  5  2 10  7  4  1  9  6  3
CODE-5:   5 10  4  9  3  8  2  7  1  6
CODE-6:  10  9  8  7  6  5  4  3  2  1
CODE-7:   9  7  5  3  1 10  8  6  4  2
CODE-8:   7  3 10  6  2  9  5  1  8  4
CODE-9:   3  6  9  1  4  7 10  2  5  8
CODE-10:  6  1  7  2  8  3  9  4 10  5
```
FIG.3
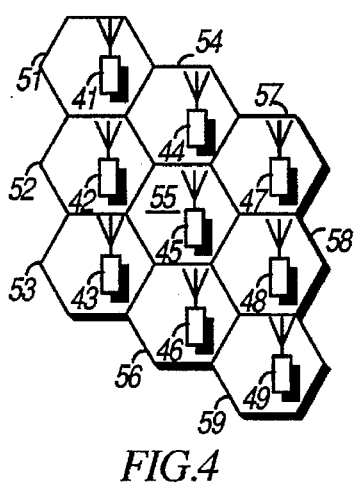
FIG.4
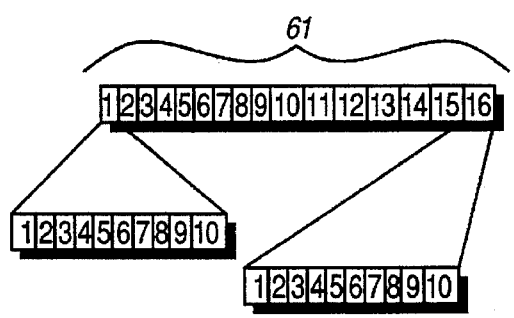
FIG.5

MAHO METHOD FOR SFH-CDMA/TDMA USING PUNCTURED FRAMES

This is a continuation of application Ser. No. 07/970,213, filed Nov. 2, 1992 and now abandoned.

FIELD OF THE INVENTION

The field of the invention relates to communication systems and in specific to cellular communication systems using frequency hopping.

BACKGROUND OF THE INVENTION

Cellular communication systems are known. Such systems, typically, provide communication services throughout a broad geographic area through a number of base sites distributed throughout the geographic area. The base sites of the system, and associated coverage areas, are arranged within the geographic area in such a manner to provide substantially seamless coverage for communication units passing through the geographic area by being passed from one base site to another.

Base sites within the cellular system offer communication services to communication units within their service coverage areas on a number of communications frequencies (communication resources) $(f_1-f_n)$ reserved for such use. Such communication services are facilitated by the transmission of an identification signal by a base site. The identification signal is used by communication units as a means of identifying proximate base sites through which service may be requested.

Service within the communication system is provided to requesting communication units through a proximate base site upon receipt of an access request and upon verification that the communication unit is registered within the system. Notification of service may be provided to the communication unit by the base site transmitting a resource allocation to the communication unit. The base site may also allocate a transceiver and voice path through the base site providing access to a communication target.

The communication resource allocated for use by the communication unit is typically in the nature of a duplex traffic channel that, in the case of a frequency division multiple access system, may be a voice channel comprised of a frequency pair (transmit and receive). In other systems the duplex voice channel may exist within a common spectrum using spreading codes (as with a code division multiple access (CDMA) communication system). In still other systems the duplex voice channel may be comprised of slots on a transmit and receive frequency of a time division multiple access (TDMA/TDM) system such as, for example, the Global System for Mobile Communications (GSM) Pan-European digital cellular system, as specified in GSM recommendations available from the European Telecommunications Standards Institute (ETSI). Under GSM a number of voice channels may exist within the slots of a repeating GSM frame.

As a means of reducing in reference within a GSM-like system the frequency of the traffic channel, over which the duplex voice signal is being exchanged with the base site, may be changed after each exchanged frame. Operating frequencies for each frame (over successive hopped frames), in such case, may be generated by a hopping algorithm such as, for example, GSM recommendation 6.2.3. The use of frequency hopping within a GSM system brings such a system within the definition of CDMA.

As the duplex voice signal is maintained, signal measurements are used to detect movement of the communication unit relative to the base site. As the communication unit moves out of the coverage area of a serving base site such movement must be detected and another base site selected for handoff before signal loss occurs.

The need for handoff in some systems may be detected by measurement of a signal quality factor (such a received signal strength indication (RSSI)) of the served communication unit by base sites surrounding the served communication unit. In other systems the served communication unit measures signals of surrounding base sites, using a method referred to as mobile assisted handoff (MAHO). In MAHO systems the most reliable signal for signal quality measurements is the control channel used by the measured base site.

MAHO signal measurements are transferred to the serving base site by the communication unit on a slow associated control channel (SACCH) used in conjunction with a traffic channel. Such signal measurements may be, in turn, transferred to a mobile switching center (MSC) for a determination of a handoff target. Handoff, in such case, is accomplished by the serving base site transmitting a handoff command to the served communication unit.

While handoff, under MAHO, has worked well in the past, such success has been based upon readily available control signals of surrounding base sites located on fixed frequencies, identifiable through a minimum of scanning or information transfer from a serving base site. Such availability is necessary because of the limited time that a communication unit has between communicated frames for scanning for nearby base sites.

In MAHO systems using frequency hopping, such hopping has been confined to traffic channels, with control channels existing on fixed frequencies. Because of the importance of frequency hopping in reducing interference, a need exists for a method of using MAHO in connection with frequency hopping control channels.

SUMMARY OF THE INVENTION

In a frequency hopping cellular communication system having a number of base sites and using mobile assisted handoff, a method is offered of providing base site identification signals. The method includes the steps of assigning each base site of the number of base sites to a slot of a intersite control frame; and, periodically transmitting, in the assigned slot of the intersite control frame, the identification signal of the base site.

BRIEF DESCRIPTION OF THE DRAWINGS

FIG. 1 comprises a block diagram of a base site in accordance with the invention.

FIG. 2 comprises a block diagram of a mobile communication unit in accordance with the invention.

FIG. 3 depicts a table of hopping codes in accordance with the invention.

FIG. 4 depicts a communication system in accordance with the invention.

FIG. 5 depicts a multiframe including the intersite control frame in accordance with the invention.

DETAILED DESCRIPTION OF THE PREFERRED EMBODIMENT

Figure 6:
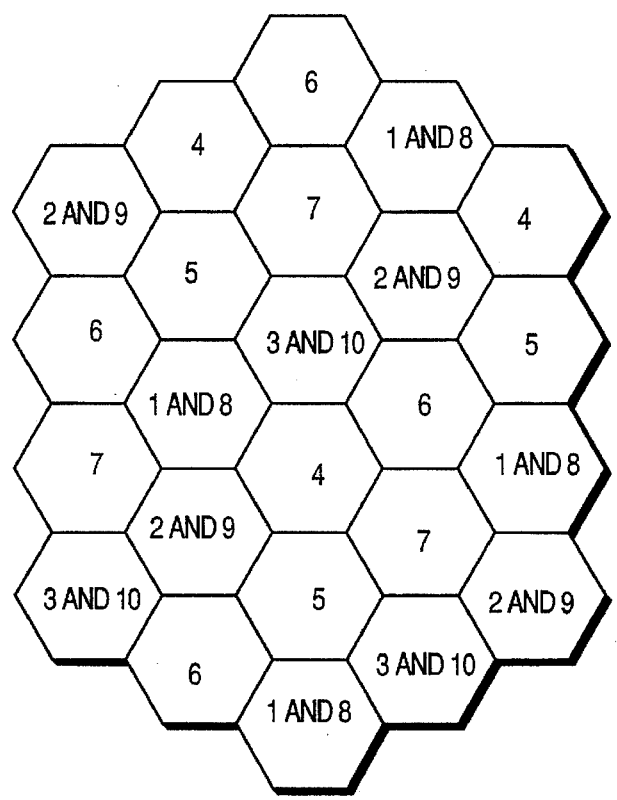
FIG. 6 comprises a common channel reuse plan for the intersite control frequency in accordance with the invention.

The solution to the problem of making MAHO signals readily available to communication units within a frequency hopping communication system lies, conceptually, in the transmission of MAHO signals from a number of base sites within an inter-base site (intersite) control frame having multiple slots and transmitted, intermittently, on a fixed frequency. Interrupting (puncturing) the frequency hopping multiframe allows for the regular transmission of MAHO signals without loss of the interference reducing benefits of frequency hopping.

Each base site within the communication system is constructed to transmit a MAHO identification signal within an assigned slot of the intersite control frame. Such control frame may be executed among the base sites at fixed intervals allowing communication units to measure RSSI values of a number of base sites during a single control frame; thereby providing a means of identifying a proximate base site. Identification of the proximate base site is through identification information transmitted by the base site within the MAHO signal within the assigned slot.

FIG. 1 is a block diagram of a base site generally (10) in accordance with one embodiment of the invention. included within the base site (10) is a controller (11), and transceivers (12–13). Also shown in FIG. 1, in conjunction with the base site (10), are communication units (20–22).

FIG. 2 is a block diagram of a communication unit (20, 21, or 22). Included within the communication unit (FIG. 2) is a controller (30), transceiver (31), and a signal measurement device (32). The signal measurement device (32) measures a signal quality factor such as a received signal strength indication (RSSI), bit error rate (BER), carrier to interference (C/I), or frame erasure rate (FER).

Access requests, call set-up, and call maintenance, between communication units (20–22) and base sites (10) occurs under any of a number of prior art signaling protocols (e.g., GSM). Traffic channels and control channels, in accordance with the invention, exist under a hopping format. (e.g., under a hopping code) within a predetermined group of hopped frequencies. Information exchanged on the hopped frequencies is exchanged under a time division multiple access (TDMA) format (e.g., with 10 slots) with one frame exchanged on each hopped frequency. The control channel occupies a predetermined slot (e.g., slot 1) with the frame of an at least one hopped channel per base site. Traffic channels occupy the remainder of the slots.

FIG. 3 is a table of hopping codes that may be used by a communication unit (20–22); first on a control channel, and then on a subsequently assigned traffic channel. A communication unit (20–22), following channel set-up is assigned to a traffic channel defined by the hopping code and a slot number under the hopping code. Under the preferred embodiment the assigned slot may be any available traffic channel (slots 2–9) of a base site primary channel or any channel (slots 1–10) on a secondary channel.

Identification of base sites (10) to communication units (20–22) is through the transmission of the MAHO identification signal by the base site (10) within an assigned slot of the inter-site control frame. Inter-site control frames are transmitted, under the preferred embodiment, in the ratio of one inter-site control frame for each sixteen frames on a traffic channel.

In accordance with the invention, the MAHO information transmitted within each slot of the intersite control frame includes an identification code of the transmitting base site and the hopping code used by the base site. The identification of the base site provides the information necessary for handoff of a call through the cellular infrastructure. The hopping code, on the other hand, provides the information necessary for the communication unit to access the control channel (slot 1) of a selected base site.

By way of example FIG. 4 represents a communication system generally (40) comprised of a number of service coverage areas (51–59), each having a base site (10) at locations 41–49 (base site 10 at locations 41–49 will hereinafter be referred to as base site 41–49). Base sites (41–49) provide communication services within their respective service coverage areas (51–59) under a hopping code (FIG. 3) exclusively assigned to that site.

Communication system 40 operates under frequency hopping on channels 1–10 with channel 1 designated as the intersite frequency for intersite control transmissions. Base site 42 operates under hopping code 1. Likewise base site 43 operates on hopping code 2, base site 44 operates on hopping code 3, base site 45 operates on hopping code 4, base site 46 operates on hopping code 5, base site 47 operates on hopping code 6, and base site 48 operates on hopping code 7.

Because of the large number of possible hopping codes, the communication system (40) may operate with a reuse factor of 1 relative to traffic channels, among base sites (41–49). Intersite control transmission, on the other hand, occur on common frequencies and require a reuse format. Under the preferred embodiment, base sites are assigned to slots of the intersite control frame based upon geographic location within an intersite reuse group. Geographic limitations for the assignment of slots require separations of reusing base sites consistent with a reuse factor of 7. A reuse factor of 7 may be ensured by assignment of intersite frequencies to base (41–49) based upon any of a number of prior art methods, such as for example the slot assignment scenario shown in FIG. 6.

Upon activation, a communication unit (20, 21, or 22) tunes to the intersite control frequency and waits for an intersite control frame. The intersite control frame in addition to providing a means of identifying local base sites also provides a means for initially synchronizing to the communication system.

Upon the occurrence of the intersite control frame the communication unit (20, 21, or 22) measures signal quality factors of surrounding base sites (41–49) of the intersite control frame as a means of identifying a proximate base site (41–49). The communication unit (20–22) selects the base site (41–49) providing the highest relative signal quality factor as a serving base site. Following selection of a serving base site the communication unit (20–22) may tune to the control channel (slot 1) of the serving base site and request access to, and be granted an allocated traffic channel. During a communication transaction a communication unit (20–22) periodically measures the signal quality factor of surrounding base sites on the intersite control frame as a means of determining a need for handoff. Such measurements are transferred to the serving base site (41–49) on the SACCH. A determination of a need for handoff is made, based upon such measurements, as under the prior art (e.g., GSM).

The exchange of communicated signals between a communication unit (20–22) and base site (41–49) occurs on a communication channel within a multiframe (61, FIG. 5). Within the multiframe a repeating set of traffic frames (1–15) is subdivided into TDM slots (1–10).

Under the preferred embodiment, one frame (16) of the multiframe (62) is reserved for the intersite control frame. Within the intersite control frame each base site of intersite reuse group (42–48) transmits an identification signal on an assigned slot (e.g., base site 42 within slots 1 and 8, base site 43, within slots 2 and 9, base site 44 within slots 3 and 10, base site 45 within slot 4, base site 46 within slot 5, base site 47 within slot 6, and base site 48 within slot 7.

Base sites 42, 43, and 44 transmit in two slots (1 and 8, 2 and 9, and 3 and 10) to allow a communication unit (20–22) assigned to slots 8, 9, or 10 of the preceding frame (traffic frame 15) of the multiframe a second opportunity to measure a signal quality factor of base sites 42, 43, and 44. A second opportunity is necessary because a communication unit (20–22) assigned to slot 10 of frame 15 would not have time to re-tune and measure a signal quality factor in slot 1 of frame 16. Likewise a communication unit (20–22) assigned to slots 8 or 9 may not have time to tune to and measure a signal quality factor in slots 2 and 3 of a succeeding frame. The solution is to repeat the transmission of slots 1, 2, and 3 in slots 8, 9, and 10.

FIG. 6 shows slot assignments within the communication system (40). As shown assignment of base site 42 to slots 1 and 8, in a first reuse group in a first geographic area would result in transmissions within slots 1 and 8 of the intersite control frame from other reuse groups, to areas no closer than 4.58 R from base site 42. Likewise assignment of slot 5 to base site 46 results in a similar distance from other re-using base sites within the intersite control frame. The use of a reuse factor of 7 in conjunction with transmissions from base sites within the intersite control frame beneficially insures that a communication unlit (20–22) will measure signal quality factors of local base sites, proximate the measuring communication unit (20–22).

Figure 7:
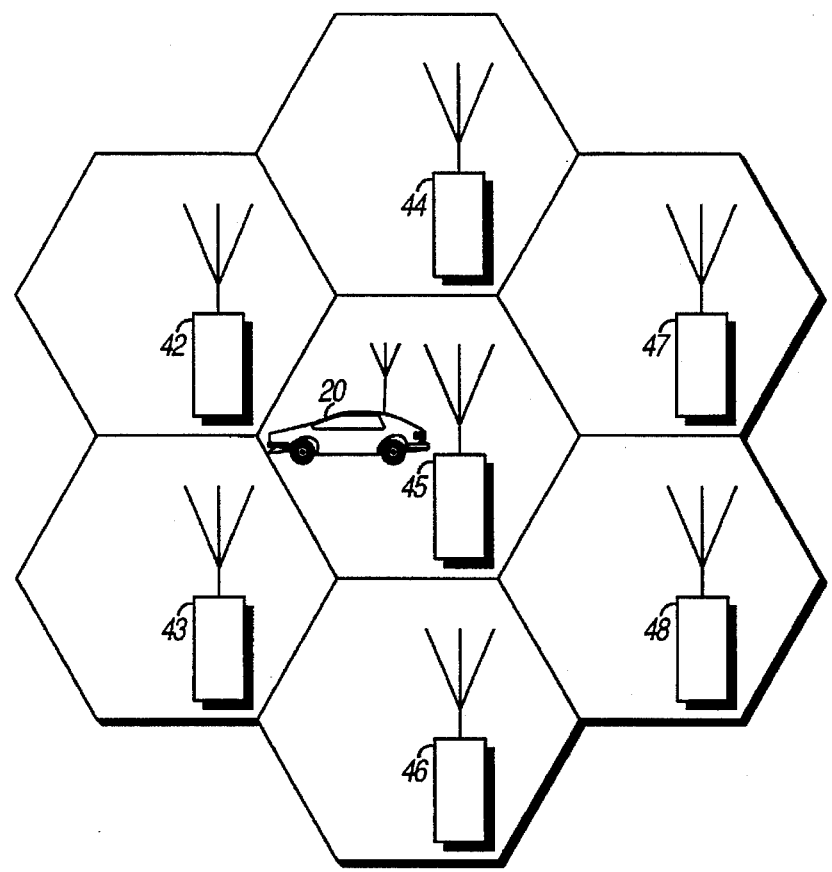
FIG. 7 comprises a reuse group of the intersite control frame in accordance with the invention.

FIG. 7 shows a communication unit (20) in the service coverage area of base site 45. Upon activation the communication unit (20) tunes to the common channel (1) for the intersite control frame.

Upon detecting and measuring the intersite control frame, the communication unit (20) determines that the transmission in slot 4, from base site 45, has the best signal quality factor. Upon decoding the information within slot 4 the communication unit (20) determines that base site 45 is operating on hopping code 4.

Upon reference to memory (33) the communication unit (20) determines the hopping sequence of base site 45. Upon such determination the communication unit (20) synchronizes with slot 1 of the serving base site (45) in anticipation of making and receiving calls.

Upon transmission of an access request, the communication unit (20) may receive a channel allocation (e.g., slot 2) and proceed through channel set-up while still tuned to slot 1. During channel set-up a counter (not shown) within the controller (30) of the communication unit (20) is set identifying the timing of the intersite control frame. Upon completion of channel set-up the communication unit (20) tunes to the traffic channel (slot 2) and begins exchanging a communicated signal through the serving base site (45).

While exchanging the communicated signal on the traffic channel (slot 2) the counter within the controller (30) of the communication unit (20) periodically notifies the communication unit (20) to tune to the common channel (1) and periodically (every 15th frame) measure the signal quality factor of surrounding base sites (42, 43, 44, 46, 47, and 48). Such measurements are transferred to the serving base site (45) on the SACCH for a determination of a need for handoff.

In another embodiment of the invention, the intersite control frame is alternately, or simultaneously, transmitted on two or more intersite frequencies. Use of two or more intersite frequencies for the intersite control frame mini- mizes the affects of Rayleigh fading by allowing transmission of the intersite control frame on two channels. Communication units (20–22), under such an embodiment, would alternately measure signal quality factors of a base site of each frequency and average readings between channels.

Three scenarios can be used for the transmission of intersite control frames. Under a first scenario, base sites transmit the intersite control frame on a single frequency using different slots and incrementing to another intersite frequency every intersite control frame. Under another scenario the intersite control frame may be transmitted simultaneously on two or more frequencies in different slots. In a third scenario base sites would simultaneously occupy the same slots on different frequencies.

In another embodiment of the invention assignment of intersite control frame slots is under the control of individual base sites (41–49). Under such an embodiment each base site (41–49), upon activation, measures a signal quality factor of other base sites (41–49) within the intersite control frame in preparation for selecting a slot. The measuring base site (41–49) then selects a slot based upon the slot with the lowest signal quality factor. Selection of a slot, under one embodiment of the invention, also determines other operating parameters to be used by the base site (e.g., a hopping code, pilot selection, or control channel). Use of a selected slot to determine other parameters within the system allows a communication unit (41–49) to infer such parameters without further need for information exchange.

We claim:

1. In a frequency hopped cellular communication system having a plurality of base sites, each of the plurality of base sites having a unique hopping sequence, a method of providing identification signals comprising the steps of: changing a transmit channel of the plurality of base sites to an intersite control frequency during a time period used to transmit an intersite control frame; and, transmitting, in a slot of the intersite control frame assigned to a particular base site of the plurality of base sites, an identification signal of the particular base site.

2. The method as in claim 1 further including, before the step of changing the plurality of base sites to an intersite control frequency, the step of interrupting the unique hopping sequence of the transmissions of at least some base sites of the plurality of base sites for transmission of the intersite control frame.

3. The method as in claim 1 further including the steps of: interrupting a hopping sequence of a communication unit prior to receiving the intersite control frame; tuning the communication unit to the intersite control frequency; receiving the intersite control frame; and measuring a signal quality factor of at least some of the plurality of base sites during the intersite control frame.

4. The method as in claim 3 further including the step of resuming the hopping sequence, by the communication unit after reception of the intersite control frame.

5. The method as in claim 1 further including the step of selecting the slot of the intersite control frame by signal quality measurements made by the particular base site.

6. The method as in claim 5 further including the step of defining operating parameters of the base site based upon the slot selected.

7. In a frequency hopped cellular communication system having a plurality of base sites, each of the plurality of base sites having a hopping sequence and using one of a mobile assisted handoff and a mobile directed handoff, a method of providing an identification signal comprising the steps of:

changing a transmit channel of the plurality of base sites to an intersite control frequency during a time period used to transmit an intersite control frame; and, transmitting the identification signal of a first base site within a first slot of the intersite control frame and the identification signal of a second base site within a second slot of the intersite control frame.

8. The method as in claim 7 further including the step of resuming the hopping sequence of each of the plurality of base sites, after the intersite control frame.

9. The method as in claim 7 further including the steps of: interrupting the hopping sequence of a communication unit prior to receiving the intersite control frame; tuning the communication unit to an intersite control frequency; measuring a signal quality factor of a signal received from a base site during the intersite control frame; and resuming the hopping sequence of the communication unit.

10. In a frequency hopped cellular communication system having a plurality of base sites, each having a hopping sequence, a method of providing a plurality of identification signals comprising the steps of: changing a transmit channel of the plurality of base sites to an intersite control frequency during a time period used to transmit an intersite control frame; assigning each of the plurality of base sites to a slot of the intersite control frame; and, transmitting at least one of the plurality of identification signals of the plurality of base sites, in the slot.

11. The method as in claim 10 further including the step of interrupting the hopping sequence of the transmissions of the plurality of base sites for transmission of the intersite control frame.

12. The method as in claim 11 further including the step of resuming the hopping sequence of the plurality of base sites, after transmission of the intersite control frame.

13. The method as in claim 10 further including the steps of: interrupting the hopping sequence of a communication unit; tuning the communication unit to the intersite control frequency prior to receiving the intersite control frame; measuring a signal quality factor of a signal received from a base site; and resuming the hopping sequence of the communication unit.

14. A method of receiving a plurality of identification signals by a communication unit from a plurality of base sites in a frequency hopped cellular communication system, such method comprising the steps of: interrupting a hopping sequence; and receiving an intersite control frame, the intersite control frame having a plurality of slots, each of the plurality of slots being used by at least one of the plurality of base sites to provide a particular identification signal.

15. The method as in claim 14 further including the step of resuming the hopping sequence after receiving the intersite control frame.

16. The method as in claim 14 further including the step of measuring a signal quality factor of a signal transmitted from one of the plurality of base sites within a slot of the plurality of slots of the intersite control frame.

17. The method as in claim 16 further including the steps of: identifying a preferred signal of a plurality of signals received during the intersite control frame, the preferred signal having a highest relative magnitude signal quality factor; decoding an identification code of the preferred signal; and selecting a base site of the plurality of base sites providing the preferred signal based upon the identification code.

18. A method of receiving a plurality of identification signals by a communication unit from a plurality of base sites in a cellular communication system, such method comprising the steps of: interrupting a signal processing sequence; and receiving an intersite control frame from the plurality of base sites, the intersite control frame having a plurality of slots, each of the plurality of slots being used by at least one of the plurality of base sites to provide a particular identification signal.

19. The method as in claim 18 further including the step of resuming the signal processing sequence after receiving the intersite control frame.

20. The method as in claim 18 further including the steps of: measuring a signal quality factor of a signal transmitted from one of the plurality of base sites within a slot of the plurality of slots of the intersite control frame; identifying a preferred signal of a plurality of signals received during the intersite control frame, the preferred signal having a highest relative magnitude signal quality factor; decoding an identification code of the preferred signal; and selecting a base site of the plurality of base sites providing the preferred signal based upon the identification code.

* * * * *